April 27, 1965   F. PERHINK   3,180,429
WEED PULLER
Filed April 12, 1963   4 Sheets-Sheet 4
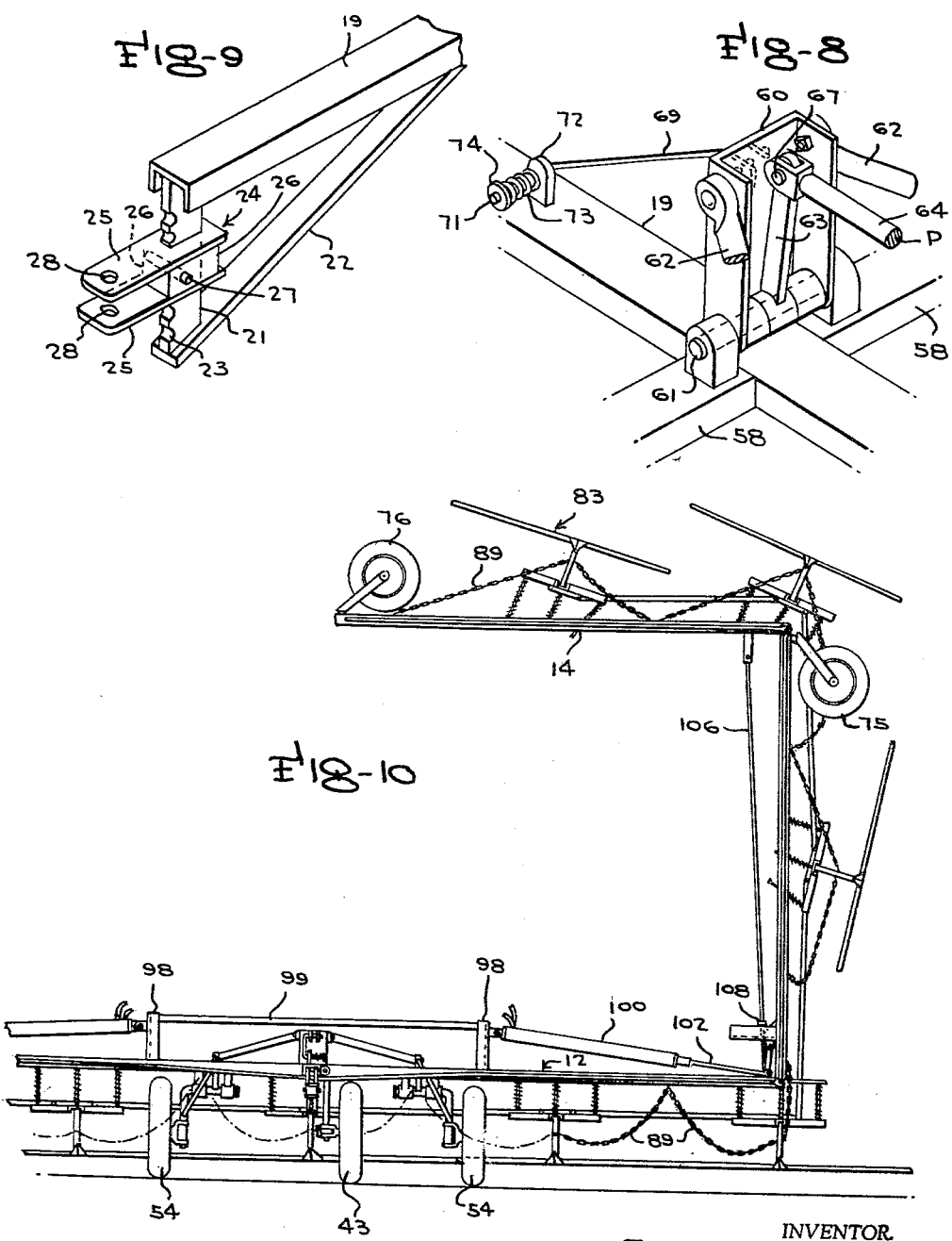
INVENTOR.
FRED PERHINK
BY
McMorrow, Berman & Davidson
ATTORNEYS 3,180,429
WEED PULLER
Fred Perhink, 330 2nd Ave. SE., Calgary,
Alberta, Canada
Filed Apr. 12, 1963, Ser. No. 272,612
5 Claims. (Cl. 172—456)

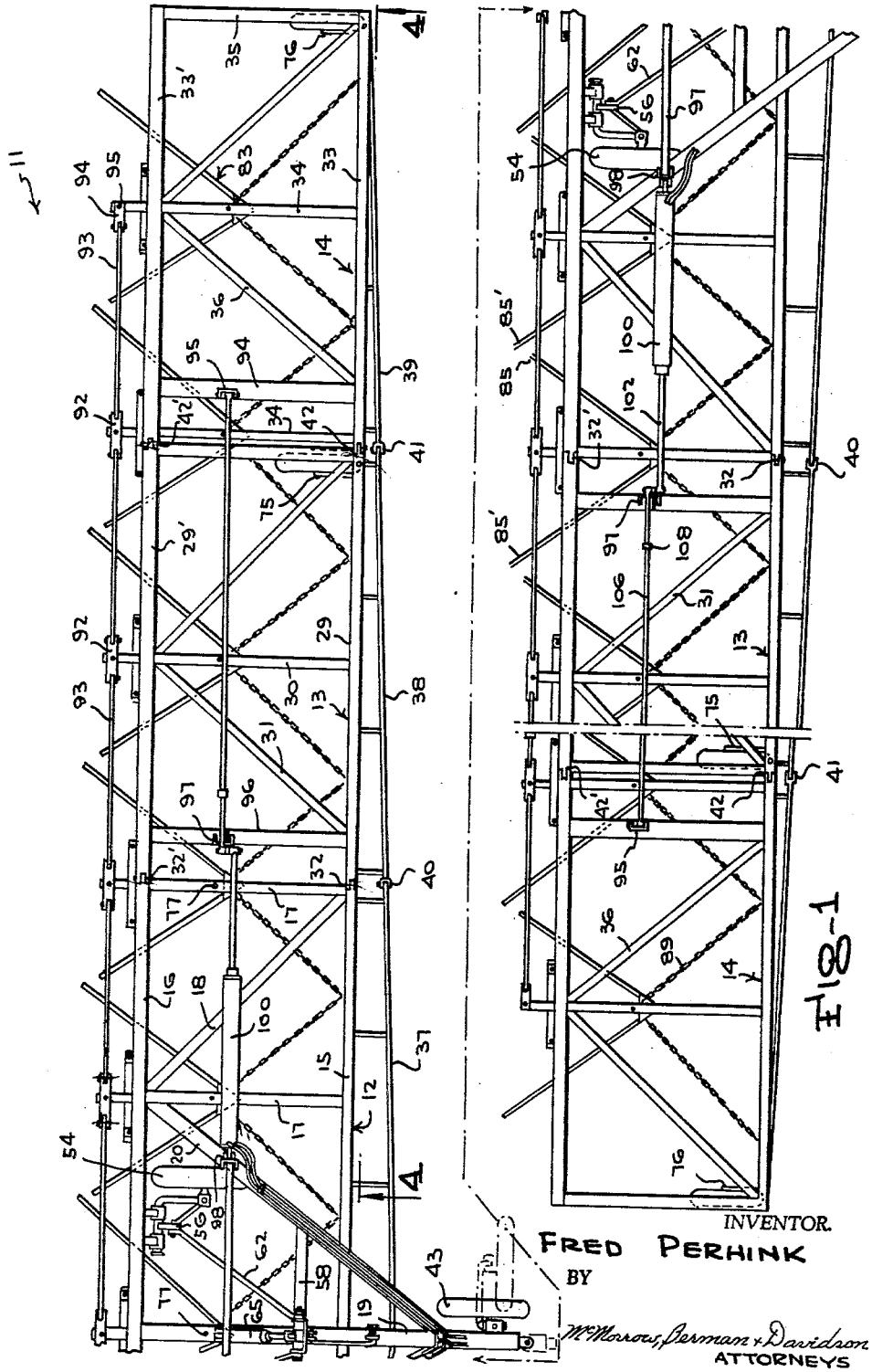

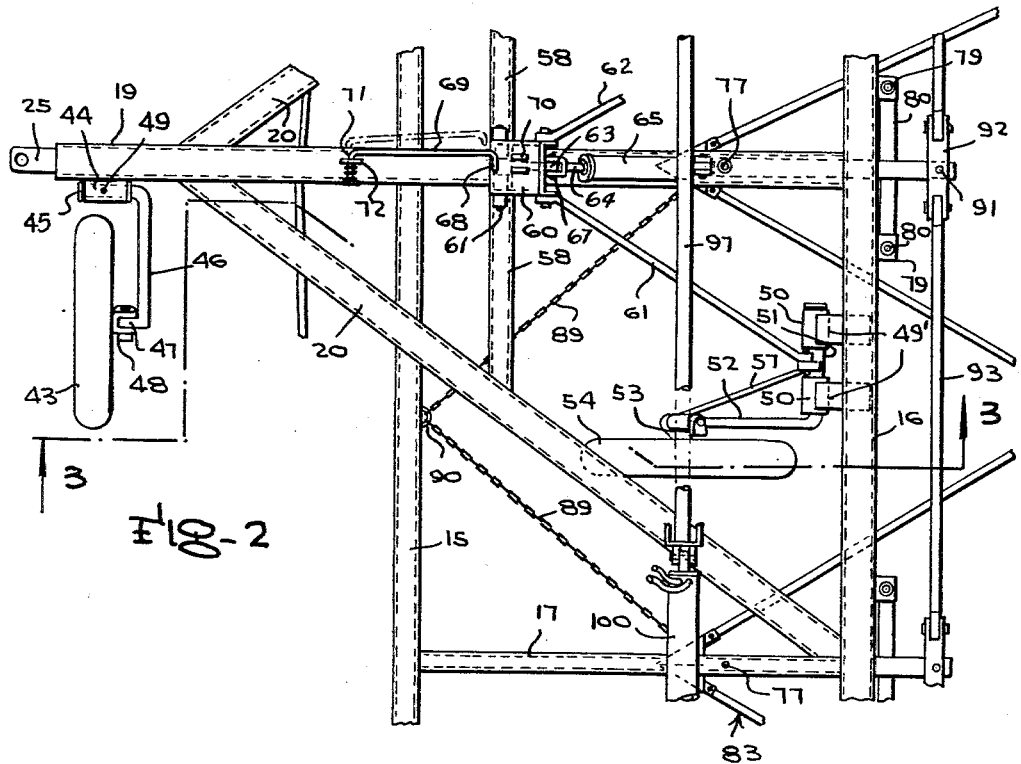
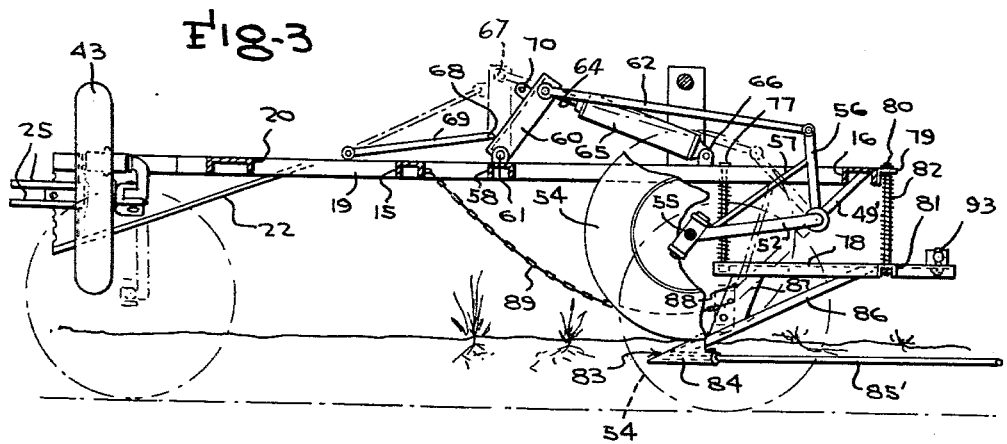

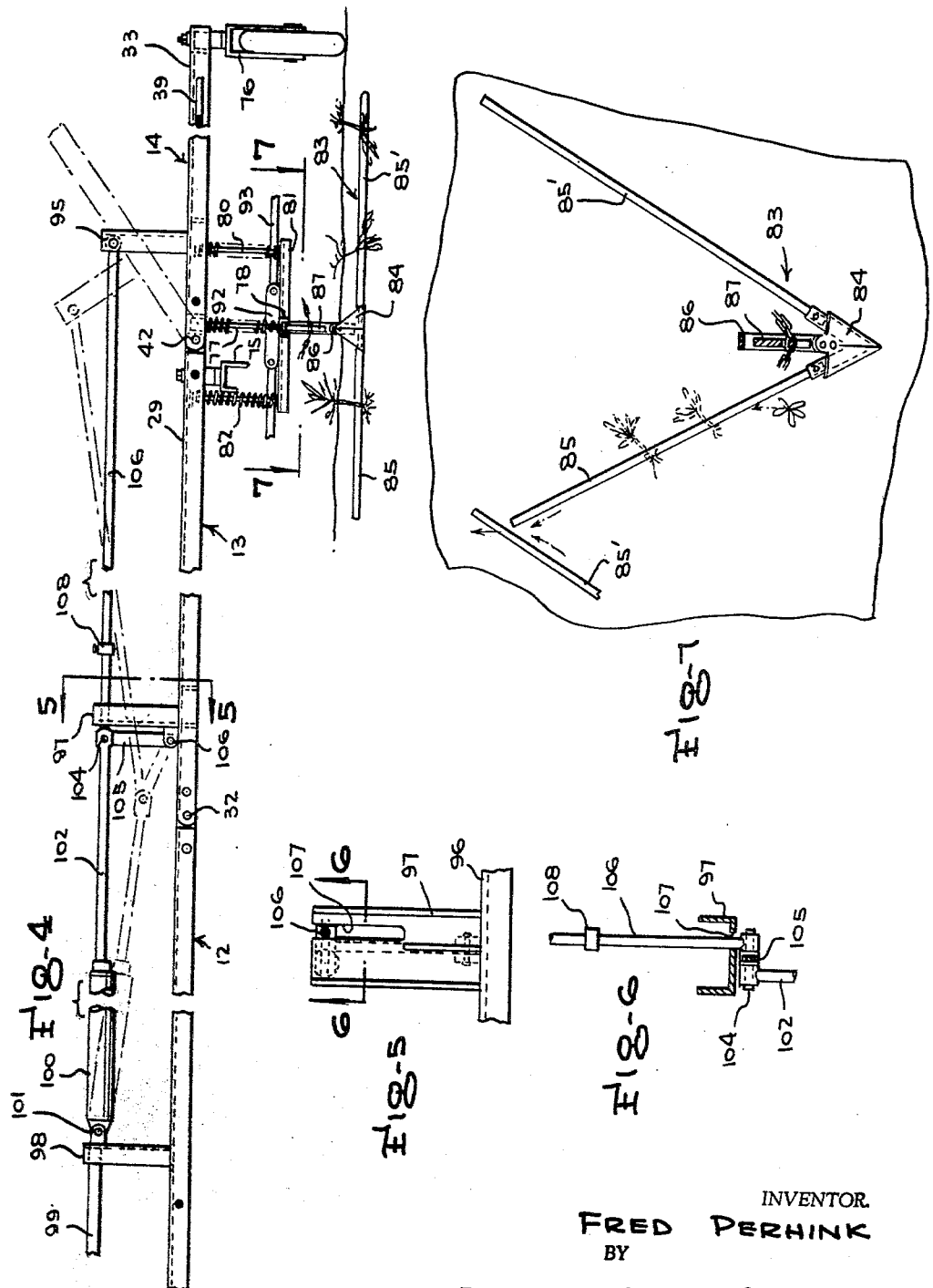

This invention relates to cultivating implements, and more particularly to an implement that pulls weeds out of the ground and turns their roots up, exposing them to sunlight, so that the weeds are destroyed by such exposure.

A main object of the invention is to provide a novel and improved weed puller which is relatively simple in construction, which covers a wide working area when it is in operative position but which is foldable to a relatively compact size for transportation, and which is provided with working blade elements which are engaged below the surface of the ground during operation of the implement, acting to intercept the root systems of weeds without cutting them but operating to turn the weeds over so that their roots are exposed to the sun and so that the weeds are destroyed by such exposure, the soil beneath the operating blades being relatively undisturbed, and the action being such that any moisture in the upturned soil and weed material is allowed to drain back into the ground.

A further object of the invention is to provide an improved weed-pulling implement which is relatively inexpensive to fabricate, which is durable in construction, which is easy to operate, and which can be readily folded to a relatively narrow width to facilitate its transportation or storage.

Further objects and advantages of the invention will become apparent from the following description and claims, and from the accompanying drawings, wherein:

FIGURE 1 is a top plan view of an improved weed-pulling implement constructed in accordance with the present invention, shown in unfolded operating position.

FIGURE 2 is an enlarged fragmentary top plan view of the forward central portion of the weed-pulling implement of FIGURE 1.

FIGURE 3 is a vertical cross sectional view taken substantially on the line 3—3 of FIGURE 2.

FIGURE 4 is a fragmentary vertical cross sectional view taken substantially on the line 4—4 of FIGURE 1.

FIGURE 5 is an enlarged vertical cross sectional view taken substantially on the line 5—5 of FIGURE 4.

FIGURE 6 is a cross sectional detail view taken substantially on the line 6—6 of FIGURE 5.

FIGURE 7 is a fragmentary horizontal cross sectional view taken substantially on the line 7—7 of FIGURE 4.

FIGURE 8 is an enlarged fragmentary perspective view of a portion of one of the wheel elevating and lowering mechanisms employed in the weed-pulling implement of FIGURES 1 to 7.

FIGURE 9 is an enlarged front perspective view of the adjustable hitch assembly employed in the weed-pulling implement of FIGURES 1 to 8.

FIGURE 10 is a fragmentary front elevational view of the weed-puling implement shown in its folded condition.

Referring to the drawings, 11 generally designates an improved weed-pulling machine constructed in accordance with the present invention. The machine 11 comprises a foldable supporting frame consisting of a main central section 12 and a plurality of auxiliary sections hinged to opposite sides of the main section 12, for example, the respective laterally extending auxiliary sections 13 and 14 disposed on opposite sides of the main section 12.

The main section 12 comprises the parallel front and rear channel bars 15 and 16 connected by cross bars 17 to define a generally rectangular rigid frame, which is further rigidified by the provision of diagonal brace bars 18. A central longitudinally extending hitch bar 19 projects forwardly a substantial distance on the section 12 and is rigidly braced to the frame of said section by the provision of a pair of rearwardly divergent brace bars 20, 20 connected to the forward portion of the hitch bar 19 and diagonally secured on the frame section 12.

Rigidly secured to the underside of the forward portion of the hitch bar 19 is a depending vertical bar member 21 whose lower end is rigidly secured to the hitch bar 19 by an inclined strut bar 22, as shown in FIGURES 3 and 9. The front edge of the vertical bar member 21 is formed with the spaced semi-cylindrical notches 23, and slidably engaged on the bar member 21 is a hitch bracket 24 including the upper and lower longitudinally extending draw bar elements 25, 25 which are spaced apart by a pair of vertical spacer plates 26, 26 through which extends horizontal locking pin 27, the pin 27 being removable to allow the adjustment of the bracket structure 24 vertically. The pin 27 engages in a selected notch 23 to lock the hitch bracket 24 in a desired position of vertical adjustment on the bar 21.

The forward ends of the draw bar members 25, 25 are provided with vertically aligned apertures 28, 28 to receive a hitch pin for connecting the machine to a tractor or other pulling vehicle.

The auxiliary frame sections 13 each comprises a pair of parallel channel bars 29, 29' connected by cross bars 30 and additionally braced by diagonal bars 31. The channel bars 29, 29' are hingedly connected at 32, 32' to the ends of the main frame bars 15 and 16 of section 12, the hinge axes being longitudinally aligned so that the section 13 may be folded upwardly relative to the section 12 in the manner illustrated in FIGURE 10.

The outer auxiliary frame sections 14 each comprises a pair of main channel bars 33, 33' connected by intermediate cross bars 34 and connected at their outer ends by end cross bars 35. The outer auxiliary frame sections are rigidly braced by diagonal bars 36.

Additional brace rods 37, 38 and 39 are secured respectively to the front frame bars 15, 29 and 33 in forwardly spaced relation thereto, being hingedly connected at 40 and 41 on axes aligned with the hinge axes of the connected sections.

The frame bars 33 and 33' of the outer sections 14 are hingedly connected at 42, 42' to the outer ends of the main frame bars 29, 29' of section 13, the hinge connections 42, 42' being longitudinally aligned. The rod hinge connections 40 are longitudinally aligned with the hinge connections 32, 32' and the rod hinge connections 41 are longitudinally aligned with the hinge connections 42, 42'.

A supporting wheel 43 is provided at the forward end of the hitch bar 19 for at times supporting the forward end of the machine, namely, when the machine is not connected to a tractor or other pulling vehicle. Thus, a sleeve 44 is secured to one side of the forward end portion of the hitch bar 19, and extending through said sleeve is the longitudinally directed shaft portion 45 of a wheel supporting arm 46 whose main body portion extends at right angles to the shaft portion 45. The arm 46 is provided at its free end with a lug 47 extending parallel to the shaft portion 45 on which is swiveled an axle 48 rotatably carrying the wheel 43. A locking pin 49 is engageable through the sleeve 44 and the shaft 45, said shaft being formed with intersecting bores at right angles to each other arranged to receive the locking pin 49 whereby to support the arm 46 in a raised position, wherein the wheel 43 is substantially elevated, as shown in FIGURE 3, or in a lowered position, shown in dotted view in FIGURE 3, wherein the wheel 43 engages the ground and is constrained to support the forward portion of the machine. The arm 46 may be locked in its lowered position by engaging the pin 49 through the associated transverse bore of shaft portion 45. With the wheel 43 locked in its lowered position, the axis of its swivel connection between lug 47 and axle 48 is substantially vertical, so that the wheel is free to swivel around a vertical axis and to assume a direction corresponding to the direction in which the apparatus is being pulled, in the manner of a conventional caster wheel.

Secured to the frame bar 16 and spaced symmetrically on opposite sides of the elongated central longitudinally extending frame bar 19 are respective pairs of spaced bracket plates 49', 49' to which are secured longitudinally aligned bearing sleeves 50, 50. As shown in FIGURE 2, the sleeves 50, 50 have a common axis which extends parallel to the frame bars 16. Journalled in the sleeves is a shaft member 51 extending perpendicularly from an arm 52. Suitably connected to the free end of each arm 52 is a supporting wheel assembly 53 including a ground-engaging wheel 54 which is journaled on the axle 55 of the wheel assembly 53. The swivelling axis of the assembly 53 is arranged so that said axis is vertical when the wheel 54 is in its lowered position, shown in dotted view in FIGURE 3. In the elevated position of the wheel 54, shown in full line view in FIGURE 3, the wheel axle 55 extends substantially parallel to the frame bars 15 and 16 so that the wheel 54 can rotate in a plane substantially parallel to the elongated central frame bar 19.

Rigidly secured to the shaft 51 between the inclined supporting members 49', 49' is an upstanding arm 56 which is rigidly braced to the arm 52 by an inclined strut bar 57.

The forwardly convergent frame bars 20, 20 are rigidly connected at their intermediate portion to the elongated central main frame bar 19 by respective brace bars 58, 58 which are longitudinally aligned with each other and which extend parallel to the frame bar 15, as is clearly shown in FIGURE 2. Pivoted on the elongated main frame bar 19 adjacent the connections of the brace bars 58, 58 thereto is a short upwardly extending channel bar 60. As shown in FIGURE 3, the bar 60 is pivotally connected at 61 to the bar 19 for rotation on an axis parallel to the frame bars 15 and 16. The side flanges of the channel bar 60 are connected at their upper ends by respective link rods 62, 62 to the top ends of respective arms 56, 56.

Rotatably mounted on the shaft 61 within the channel-shaped member 60 is an arm 63 whose top end is pivotally connected to a piston rod 64 associated with and extending from a fluid pressure cylinder 65 pivoted at 66 to the frame bar 19. As shown in FIGURE 3, when the piston rod 64 is extended, for example, from the full line position to its dotted line position shown in FIGURE 3, the channel-shaped member 60 is rotated in a counterclockwise direction, as viewed in FIGURE 3, from its full line position to its dotted view position. This action occurs because of the thrust exerted on the channel bar by the arm 63 which is pivotally connected at 67 to the piston rod 64, as shown in FIGURE 8. The tension rods 61 cause the arms 56 to be similarly rotated in a counterclockwise direction, lowering the wheels 54 to their dotted view position shown in FIGURE 3.

The channel-shaped member 60 may be locked in its vertical dotted view position, shown in FIGURE 3, by engaging the transverse end arm 68 of a catch rod 69 through a pair of apertured retaining lugs 70, 70 provided on the web portion of the member 60. The catch rod 69 is pivotally connected at its opposite end to the frame bar 19 by the provision of a transversely extending arm 71 thereon which extends rotatably through an upstanding lug 72 provided on the frame bar 19, as shown in FIGURE 8, the arm 71 being resiliently retained in the lug 72 by the provision of a coiled spring 73 which surrounds the arm 71 and bears between lug 72 and a retaining washer 74 fastened on the end of the arm 71.

As will be readily apparent, the holding arm 68 may be engaged in the retaining lugs 70, 70 when the channel-shaped member 60 is in its vertical position, thus preventing the member 60 from rotating in a clockwise direction, as viewed in FIGURE 3, and thus holding the wheels 64 in their lowered positions so that they can support the weight of the machine. However, when the machine is in its normal operating condition, the arm 69 is released so that the wheels 54 are in their elevated positions relative to the frame of the machine, as shown in full line view in FIGURE 3.

The fluid pressure cylinder 65 is connected through suitable flexible conduits to a fluid pressure supply source provided on the pulling vehicle, suitable control valves being provided to control the admission of fluid pressure into the cylinder 65.

The auxiliary frame segments 13 and 14 are provided with swiveled caster wheel assemblies 75 and 76, the caster wheel assemblies being swivelly connected to the auxiliary frame segments 13 and 14 and being supported to engage the ground to support said auxiliary frame segments when the main wheels 54 are in their elevated positions relative to their associated frame segments 12, as shown in full line view in FIGURE 3, namely, when the machine is in its operating position.

Connected to and pivotally suspended from the main frame bar 19, and the respective cross bar members 17, 30 and 34 are support rods 77 which are loosely connected at their bottom ends to the forward ends of plow-supporting frames 78 of generally cruciform shape. Rigidly secured to the frame bars 16 are spaced pairs of lugs 79, 79 to which are similarly connected suspension rods 80, 80 which are loosely connected at their bottom ends to the cross bars 81 of the cruciform plow-supporting frames 78. Coiled springs 82 surround the suspension rods 77 and 80 and exert a downward resilient biasing force on the frames 78, biasing said frames downwardly. Thus, the springs 82 exert a downward biasing force on the arms of the frames 78, but allow said frames to swing and to undulate vertically sufficiently to allow their associated plow elements to move past obstructions and to adjust themselves to irregularities in the texture of the soil through which the plow elements are being moved.

Secured to each of the cruciform frame members 78 and carried therebelow is a forwardly convergent generally V-shaped plow member 83, each plow member comprising a generally triangular point 84 and the rearwardly diverging side bars 85, 85', as shown in FIGURE 7. Each plow assembly 83 includes an upwardly and rearwardly inclined supporting bar 86 rigidly connected at its upper end to the main arm of the associated cruciform supporting frame 78 and rigidly connected at its forward end to the main arm of the associated supporting frame 78 by a connecting plate 87. The plate 87 is formed at its forward margin with a plurality of spaced apertures 88 adapted to receive the end links of connecting chains 89 which connect the plates 87 to anchor loops 90 provided on the forward frame bar 15, as shown in FIGURE 2. The chains 89 prevent excessive side sway or deviation of the plow members 83.

Pivotally connected at 91 to the rear end portions of the main arms of the cruciform frame members 78 are respective lever arms 92, the ends of the lever arms being linked together by link rods 93, the endmost link rods 93 being connected to short lever arms 94 pivoted at 95 to the endmost plow-supporting frame members 78. Thus, the plow-supporting frames are linked together at their rear end portions by the continuous linkage defined by the members 94, 93 and 92, allowing relative vertical movements of the plow-supporting frames but controlling the movements of said frames in accordance with the degrees of freedom permitted by the connecting linkage. The free movement of the plow-supporting frames is further limited by their connections to the main frame of the machine through the suspension rods 77 and 80. The outer frame sections 14 are provided adjacent their hinged connections 42, 42' with a cross bar 94 on which is rigidly secured an upstanding channel bar 95. The frame sections 13 are likewise provided adjacent their hinged connections 32, 32' with cross bars 96 on which are rigidly secured upstanding channel bars 97. The diagonal brace bar members 20 have rigidly secured thereon upstanding channel bars 98, the channel bars 95, 97 and 98 being substantially in alignment with each other, as shown in FIGURE 1. The innermost pair of upstanding channel bars 98, 98 are rigidly connected together at their top ends by a connecting bar 99. Respective fluid pressure cylinders 100 are pivotally connected at 101 to the upstanding channel bars 98, being directed outwardly and being provided with pistons having outwardly extending piston rods 102. The piston rods 102 terminate adjacent the upstanding channel bars 97 and are connected by transverse pins 104 to link bars 105 which are in turn pivotally connected at 106' to lugs provided on the lower portions of the channel bars 97. Also pivotally connected to the ends of the piston rods 102 at the transverse connecting pins 104 are the ends of additional link rods 106 which extend slidably through vertical slots 107 provided in the channel bars 97 and are pivotally connected at their outer ends to the top ends of the respective upstanding channel bars 95. Stop collars 108 are adjustably mounted on the link bars 106 to limit the inward movement of the link bars 106 relative to the channel bars 97, providing positive abutment of the collar members 108 with said channel bars 97 after the link bars 106 have been retracted by a predetermined amount responsive to the retraction of the piston rods 102 in the fluid pressure cylinders 100. Thus, when the piston rods 102 are retracted in the cylinders 100, the end sections 14 are first elevated, for example, to the dotted view positions thereof illustrated in FIGURE 4, after which the collars 108 abut the upstanding channel bars 97 and in turn cause the next inner frame sections 13 to be elevated with continued retraction of the piston rods 102. Thus, eventually the frame sections 14 and 13 will be elevated to the positions thereof shown in FIGURE 10, wherein frame sections 13 are substantially vertical and the frame sections 14 are substantially horizontal and are parallel with and overlie the central main frame section 12.

The fluid pressure cylinders 100 are energized from the fluid pressure source provided on the pulling vehicle through suitable control valves, as in the case of the fluid pressure cylinder 65.

In operation, the piston rods 102 are fully extended and the wheels 54 are elevated to their full line positions shown in FIGURES 2 and 3, whereby the V-shaped plow assemblies 83 are allowed to penetrate beneath the surface of the ground as the machine is pulled forwardly by the pulling vehicle. The machine is of substantial width, for example, of the order of 60 feet in width, and the V-shaped plow members 83 move several inches below the surface of the soil, for example, penetrate to a depth of the order of four inches below the soil surface. The plow members intercept the root systems of weeds, and do not cut the weeds but turn them over so that the root systems are exposed to the sun and air and are thus rapidly destroyed. In this process there is no substantial disturbance of the moisture in the soil nor is the compactness of the soil beneath the plow members materially disturbed. Since the body portions of the weeds are merely inverted when the roots are thus exposed, the moisture in the weeds is allowed to drain back into the soil, so that there is no substantial loss of moisture by the weed-pulling operation of the machine.

When the machine is to be prepared for transportation or storage, the wheels 54 are lowered by action of the fluid pressure cylinder 65 to the dotted view positions thereof, shown in FIGURE 3, which elevates the apparatus. The forward wheel 43 may then be lowered to the dotted view position thereof shown in FIGURE 3 and locked in this lowered position by means of its locking pin 49. The wheel 43 is thus in a position to provide forward support for the machine when it is being towed or allowed to be independently supported. The outer frame sections are then elevated by operating the fluid pressure cylinders 100, whereby the frame sections 13 and 14 are raised to the positions illustrated in FIGURE 10.

It will be noted that with the outer sections 13 and 14 elevated, as shown in FIGURE 10, the over-all width of the machine is considerably reduced, and that furthermore the supporting wheels under these conditions comprise the wheels 43 and 54. As previously mentioned, the wheel assemblies associated with the wheels 43 and 54 are swivelled so as to turn freely on vertical axes when the asemblies are in the positions illustrated in FIGURE 10. The machine may therefore be towed laterally, namely, may be moved in the direction parallel to the frame bars 15 and 16, allowing it to be moved over an ordinary highway or other thoroughfare of standard width.

As will be readily apparent, when the fluid pressure cylinder 65 is operated to extend its piston rod and thereby cause the channel-shaped arm 60 to be rotated from the full line position of FIGURE 3 to the dotted view position thereof, whereby to lower the wheels 54, the member 60 may be locked in its vertical dotted view position of FIGURE 3 by means of the locking rod 69, as previously described.

As above mentioned, the machine is designed to cover a very wide working area, for example, an area up to 60 feet wide or more, but is foldable by the fluid pressure-operated means above described to a width of the order of 15 feet for towing. As will be apparent from FIGURE 7, the plow assemblies 83 are of sufficient width so that they completely traverse the area being worked, the rearwardly extending side bar elements 85, 85', of the plow members overlapping each other at their ends, as shown in FIGURE 7, so as to insure complete and continuous soil working over the area traversed by the machine. For this reason, one side arm 85 is preferably somewhat longer than the other side arm 85', as illustrated in FIGURE 7, so that the shorter side arm will terminate forwardly of the rear end of the longer side arm of the adjacent plow assembly. Therefore, by making one side arm 85, 85' shorter than the opposite side arm, the plow assemblies may be all mounted in the same plane and spaced sufficiently close together to insure overlapping soil working of adjacent plow assemblies.

The machine operates on hilly or rolling land as well as it does on level land. Rocky land does not create any serious hazards or difficulties in operation.

While a specific embodiment of an improved weed pulling implement has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A weed-pulling implement comprising a main horizontal frame segment, hitch means on said main frame segment adapted to be connected to a pulling vehicle, a plurality of vertically adjustable supporting wheel assemblies on said main frame segment, additional frame segments hingedly connected to opposite ends of said main frame segment and being foldable upwardly relative to said main frame segment, fluid pressure-operated means connecting the additional frame segments to the main frame segment for at times elevating said additional frame segments, forwardly convergent generally V-shaped plow members provided with cruciform supporting frame structures rigidly secured to and overlying and extending substantially parallel to the plow members, means swingably connecting the forward and lateral ends of the cruciform frame structures to the frame segments, whereby to swingably support the plow members from the frame segments substantially parallel thereto and normally being below ground level when the frame segments are horizontal, fluid pressure-operated means for lowering said wheel assemblies to elevate said plow members above ground level, additional supporting wheel assemblies swivelly connected to said additional frame assemblies, and linkage means interconnecting the rear ends of said cruciform frame structures and extending substantially parallel to said frame segments.

2. A foldable weed-pulling implement comprising a main horizontal frame segment, hitch means on said main frame segment adapted to be connected to a pulling vehicle, a plurality of vertically adjustable depending swivelled supporting wheel assemblies on said main frame segment, additional frame segments hingedly connected to opposite ends of said main frame segment and being foldable upwardly relative to said main frame segment, forwardly convergent generally V-shaped plow members provided with cruciform supporting frame structures rigidly secured to and overlying and extending substantially parallel to the plow members, means swingably connecting the forward and lateral ends of the cruciform frame structures to the frame segments, whereby to swingably support the plow members from the frame segments and spring means biasing the cruciform supporting frame structures downwardly toward positions substantially parallel to the frame segments.

3. A foldable weed-pulling implement comprising a main horizontal frame segment, hitch means on said main frame segment adapted to be connected to a pulling vehicle, a plurality of vertically adjustable depending swivelled supporting wheel assemblies on said main frame segment, additional frame segments hingedly connected to opposite ends of said main frame segment and being foldable upwardly relative to said main frame segment, forwardly convergent generally V-shaped plow members provided with cruciform supporting frame structures rigidly secured to and overlying and extending substantially parallel to the plow members, means swingably connecting the forward and lateral ends of the cruciform frame structures to the frame segments, whereby to swingably support the plow members from the frame segments, spring means biasing the cruciform supporting frame structures downwardly toward positions substantially parallel to the frame segments, and linkage means interconnecting the rear ends of the cruciform supporting frame structures and extending substantially parallel to the frame segments.

4. A foldable weed-pulling implement comprising a main horizontal frame segment, hitch means on said main frame segment adapted to be connected to a pulling vehicle, a plurality of vertically adjustable depending swivelled supporting wheel assemblies on said main frame segment, additional frame segments hingedly connected to opposite ends of said main frame segment and being foldable upwardly relative to said main frame segment, forwardly convergent generally V-shaped plow members provided with cruciform supporting frame structures rigidly secured to and overlying and extending substantially parallel to the plow members, means swingably connecting the forward and lateral ends of the cruciform frame structures to the frame segments, whereby to swingably support the plow members from the frame segments, spring means biasing the cruciform supporting frame structures downwardly toward positions substantially parallel to the frame segments, linkage means interconnecting the rear ends of the cruciform supporting frame structures and extending substantially parallel to the frame segments, and fluid pressure-operated means for lowering said supporting wheel assemblies relative to said main frame segment.

5. A foldable weed-pulling implement comprising a main horizontal frame segment, hitch means on said main frame segment adapted to be connected to a pulling vehicle, a plurality of vertically adjustable depending swivelled supporting wheel assemblies on said main frame segment, additional frame segments hingedly connected to opposite ends of said main frame segment and being foldable upwardly relative to said main frame segment, forwardly convergent generally V-shaped plow members provided with cruciform supporting frame structures rigidly secured to and overlying and extending substantially parallel to the plow members, means swingably connecting the forward and lateral ends of the cruciform frame structures to the frame segments, whereby to swingably support the plow members from the frame segments, spring means biasing the cruciform supporting frame structures downwardly toward positions substantially parallel to the frame segments, linkage means interconnecting the rear ends of the cruciform supporting frame structures and extending substantially parallel to the frame segments, fluid pressure-operated means for lowering said supporting wheel assemblies relative to said main frame segment, and additional depending supporting wheel assemblies swivelly connected to the additional frame segments.

References Cited by the Examiner
UNITED STATES PATENTS

| 1,444,572 | 2/23 | Thomason | 172—658 |
| 2,641,886 | 6/53 | Graham | 172—413 XR |
| 2,985,248 | 5/61 | Richardson | 172—619 |
| 3,003,789 | 10/61 | Calkins | 172—456 XR |

T. GRAHAM CRAVER, *Primary Examiner.*